Feb. 8, 1938.  F. H. LEJEUNE  2,107,950
METHOD OF FORMING A WHEEL
Filed April 11, 1932  2 Sheets-Sheet 1
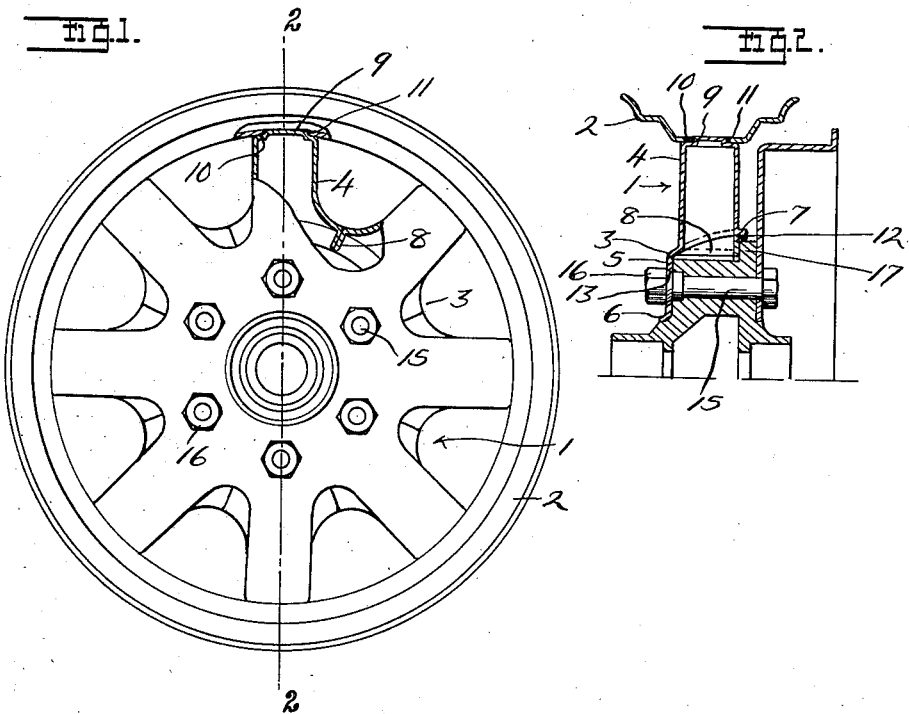
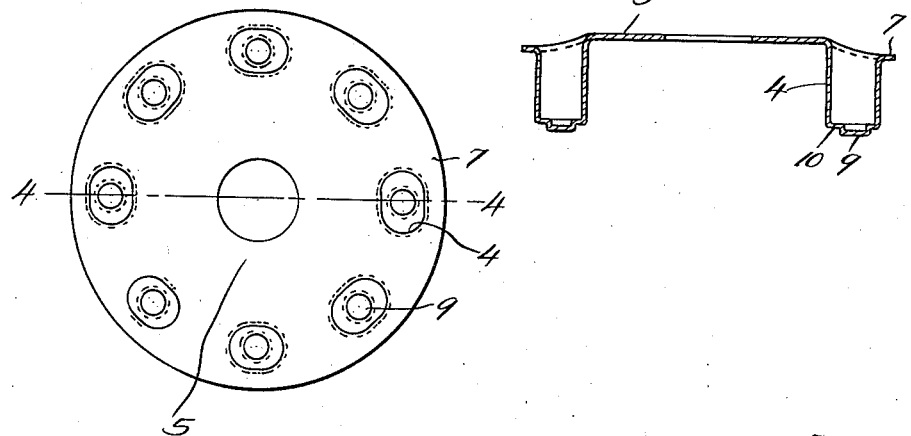
Inventor
Frank H. Lejeune
By Whittemore Hulbert Whittemore Belknap
Attorneys Feb. 8, 1938.  F. H. LEJEUNE  2,107,950
METHOD OF FORMING A WHEEL
Filed April 11, 1932  2 Sheets-Sheet 2
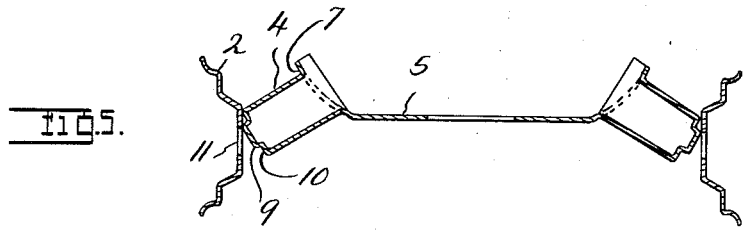
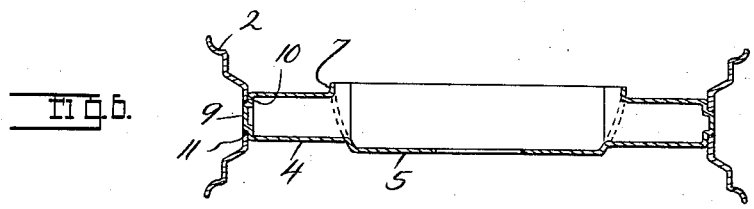
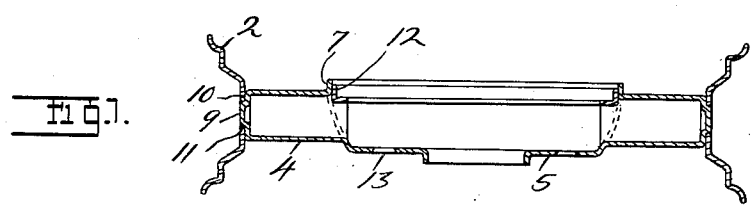
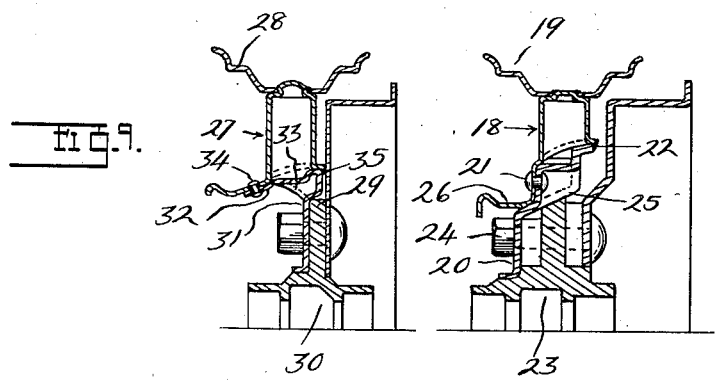
Inventor
Frank H. Lejeune
Attorneys Patented Feb. 8, 1938

2,107,950

UNITED STATES PATENT OFFICE 2,107,950

METHOD OF FORMING A WHEEL

Frank H. Le Jeune, Detroit, Mich., assignor, by mesne assignments, to The Kelsey-Hayes Wheel Company, Detroit, Mich., a corporation of Delaware Application April 11, 1932, Serial No. 604,551

11 Claims. (Cl. 29—159.03)

The invention relates to methods of forming spoked wheels and refers more particularly to a method of manufacturing sheet metal spoked wheels for motor vehicles. One of the objects of the invention is to so construct a wheel that it is strong and substantial in character. Another object is to provide an improved method of manufacturing the wheel whereby the wheel may be made economically. A further object is to provide an improved method of forming the spoked wheel body. These and other objects of the invention will become apparent from the following description, taken in connection with the accompanying drawings, in which—

Figure 1 is a front elevation, partly broken away, of a wheel embodying my invention;

Figure 2 is a cross section on the line 2—2 of Figure 1;

Figure 3 is a plan view of the wheel body blank at one stage in its manufacture;

Figure 4 is a cross section on the line 4—4 of Figure 3;

Figures 5, 6 and 7 are sectional views illustrating different steps in the manufacture of the wheel;

Figures 8 and 9 are views similar to Figure 2, showing other wheels embodying my invention.

As illustrated in Figures 1 and 2, the motor vehicle wheel embodying my invention comprises the wheel body 1 and the rim member 2 encircling and secured to the wheel body. The wheel body is formed of sheet metal and comprises the outer hub member 3 and the hollow spokes 4 integral with and radiating from the outer hub member. The outer hub member has the annular web or flange 5 which extends radially and which terminates at its inner edge in the lateral forwardly extending annular flange 6. The outer hub member also has the lateral rearwardly extending annular flange 7 at the inner ends of the spokes 4 and extending rearwardly therefrom and the radially extending return bent portions 8 between the spokes 4 forming reinforcing ribs. The spokes 4 are tubular and have at their outer ends the tenons 9 providing the annular shoulders 10 between the tenons and the main portions of the spokes. The rim member 2, as illustrated, is a tire carrying rim of the drop center type and this rim has in the base of its well the openings 11 for receiving the tenons 9. The rim member is permanently secured to the wheel body as by peening or clinching over the outer end portions of the tenons against the outer face of the rim. To reinforce the wheel body, I have provided the reinforcing ring 12 of angular cross section which is permanently secured within the outer hub member 3 and preferably the lateral annular flange 7 of this outer hub member by suitable means, such as welding.

The wheel, as shown, is of the demountable type and the web or flange 5 of the outer hub member is provided with the annular series of openings 13 through which may extend the means for securing the wheel to the inner hub 14. This means in the present instance comprises the bolts 15 and the nuts 16 threaded upon the front ends of the bolts. The reinforcing ring 12 is adapted to pilot upon the radially extending annular flange 17 of the inner hub.

In the manufacture of the wheel, the rim member may be formed in any usual manner. The wheel body is formed from a flat sheet metal blank preferably having a uniform thickness. This blank is first operated upon by a suitable punch and die to form the annular web or flange 5 and the annular series of tubular spokes 4 extending downwardly at right angles to the web or flange and located near the periphery of the blank. At the same time the lateral annular flange 7 is formed offset downwardly from the web or flange 5. The metal of the blank is drawn to provide bosses or recessed portions which form the spokes and the walls of these spokes are tapered and progressively decrease in thickness from their junctions with the web or flange 5 to their outer ends. These outer ends are also formed at this time with the tenons 9 which are preferably closed. Figures 3 and 4 illustrate the blank after the above operations have been carried out.

The blank is then operated upon by swinging the spokes 4 toward the plane of the web or flange 5 or toward a plane common to the spokes to produce the dished wheel body shown in Figure 5, in which the spokes are inclined to the plane of the web or flange. The wheel body is then placed within the rim member 2 with the tenons 9 in position to engage the openings 11 and the dish of the wheel body is straightened or the spokes are swung toward the plane of the web or flange or toward a plane common to the spokes, as shown in Figure 6, to engage the tenons 9 with the openings 11 and force the shoulders 10 firmly against the inner face of the rim. As shown in Figure 6, the axes of the spokes actually occupy a common plane, although it is apparent that they may be inclined to this plane, if desired. During the swinging of the spokes to the positions shown in Figures 5 and 6, the excess metal in the outer hub member 3 of the wheel body and between the spokes 4 is folded radially inwardly and return bent to form the return bent portions 8 which serve as reinforcing ribs.

The tenons 9 are then clinched over the outer face of the rim member 2 to permanently secure the rim member to the wheel body. The rear ends of the return bent portions 8 are also preferably cut away to provide the necessary space for the reinforcing ring 12, which is inserted into the hub member and preferably welded thereto. The other operations, such as forming the openings 13 and finishing the wheel, may then be carried out to produce the wheel structure shown in Figure 7.

In the modification shown in Figure 8 the wheel comprises the wheel body 18 and the rim member 19, which may be formed in the same manner as the corresponding parts shown in Figures 1 and 2. However, the wheel body may be formed from sheet metal of lighter gauge than that used in forming the wheel body of Figures 1 and 2, since this wheel body is permanently secured to the mounting member 20 as by means of the annular series of rivets 21 and the annular weld 22. This mounting member is preferably formed of sheet metal and is adapted to be secured to the inner hub 23 by the securing means 24, such as bolts and nuts, and it has the peripherally spaced radially depressed ribs 25 which are adapted to seat upon the inner hub in substantially the median plane of rotation of the wheel body. The wheel body has the lateral annular portion 26 at its inner edge which extends forwardly and has an open end adapted to be closed by a hub cap.

Figure 9 discloses another modification in which the wheel body 27 and the rim member 28 correspond substantially to the wheel body 18 and the rim member 19. In this construction the radially extending flange 29 of the inner hub 30 is located in rear of the median plane of the rim member, so that the mounting member 31, which is adapted to be secured to the flange of the inner hub, is shaped differently than the mounting member 20 in that it has the peripheral forwardly extending portion 32 which is suitably reinforced by the radially extending ribs 33. Suitable means, such as the rivets 34 and the annular weld 35, permanently secure the parts together.

What I claim as my invention is:

1. The method of forming a wheel body, which comprises the pressing of a flat metal blank to form a web and integral tubular spokes extending at substantially right angles to the web, the swinging of the spokes toward a plane common to the spokes, and the forming of reinforcing ribs between the spokes during the swinging of the spokes.

2. The method of forming a wheel body, which comprises pressing a flat metal blank to form a web and integral hollow spoke forming bosses extending transversely of the web, and swinging the bosses toward a plane common to the bosses.

3. The method of forming a wheel, which comprises forming a wheel body by pressing a flat metal blank to form a web and integral hollow spoke forming bosses extending transversely of the web, swinging the bosses toward a plane common to the bosses, and securing a rim member to the outer ends of the bosses.

4. The method of forming a spoked wheel body, which comprises pressing a metal blank to form integral recessed portions having unconnected closed ends and forming spokes, and swinging the recessed portions toward a plane common to the recessed portions to position the closed ends for engagement with a rim member.

5. The method of forming a one-piece sheet metal artillery wheel part which comprises striking the spoke portions from a blank sheet to substantially parallel axial relation with corresponding ends remaining integrally connected to the sheet and bending the sheet to place the spokes in operative radial relation.

6. The method of forming a one-piece sheet metal artillery wheel part which comprises pressing a sheet metal blank to have an axially offset perimetral portion, simultaneously striking the spoke portions to inoperative position from said portion and bending the sheet to place the spokes in operative radial relation.

7. The method of forming a one-piece sheet metal artillery wheel part which comprises pressing a sheet metal blank to have an axially offset perimetral portion, simultaneously striking spokes of cup-shape from said portion transversely to the general plane of the blank sheet and bending the sheet to place the spokes in operative radial relation.

8. The method of forming a one-piece sheet metal artillery wheel part which comprises preforming a sheet metal blank to provide axially-offset spoke supporting and body portions with the spokes extending in substantially axial direction, bending the blank to place the spokes in approximate operative position and subjecting the thus pre-formed blank to a final shaping operation.

9. The method of forming a one-piece sheet metal artillery wheel part which comprises preforming a sheet metal blank to provide axially-offset spoke supporting and body portions, with the spokes extending in substantially axial direction, bending the blank to place the spokes in approximate operative position and to roughly form the body, and subjecting the thus preformed blank to a final operation whereby to accurately place the spokes and complete the shaping of the wheel body.

10. The method of forming a one-piece sheet metal artillery wheel part which comprises pressing a sheet metal blank to have an axially offset perimetral portion, simultaneously striking spokes of cup-shape from said portion transversely to the general plane of the blank sheet and bending the sheet to place the spokes in operative radial relation.

11. In a method of forming pressed sheet metal spoked wheels, the step of pressing in the blank a series of pockets having closed outer ends and the step of dishing a portion of the blank merging into the pockets, the one of the steps last performed placing all of the spokes in substantially the same plane with the closed ends concentric with and substantially parallel to the axis of the wheel.

FRANK H. LE JEUNE.